(12) United States Patent
Schmidt et al.

(10) Patent No.: US 10,843,694 B2
(45) Date of Patent: Nov. 24, 2020

(54) VEHICLE HEIGHT DETECTION AND ENVIRONMENTAL WARNING SYSTEM

(71) Applicant: Toyota Motor Engineering & Manufacturing North America, Inc., Plano, TX (US)

(72) Inventors: Eric R. Schmidt, Northville, MI (US); Jeffrey E. Pierfelice, Canton, MI (US); Robert J. Crawford, Pinckney, MI (US); Nicholas S. Sitarski, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 64 days.

(21) Appl. No.: 16/195,723

(22) Filed: Nov. 19, 2018

(65) Prior Publication Data
US 2020/0156630 A1 May 21, 2020

(51) Int. Cl.
*B60W 30/095* (2012.01)
*B60W 30/09* (2012.01)
(Continued)

(52) U.S. Cl.
CPC ......... *B60W 30/0956* (2013.01); *B60Q 9/008* (2013.01); *B60W 30/09* (2013.01); *B60W 50/14* (2013.01); *G06F 16/9532* (2019.01); *B60W 2050/143* (2013.01); *B60W 2400/00* (2013.01); *B60W 2554/00* (2020.02); *B60W 2556/65* (2020.02); *B60W 2710/30* (2013.01); *B60W 2720/106* (2013.01); *B60W 2756/10* (2020.02)

(58) Field of Classification Search
CPC ... B60Q 9/008; B60W 30/09; B60W 30/0956; B60W 50/14; B60W 2050/143; B60W 2400/00; B60W 2554/00; B60W 2710/30; B60W 2720/106; B60W 2756/10; B60W 2756/65; G06F 16/9532
USPC .......................................................... 701/70
See application file for complete search history.

(56) References Cited

U.S. PATENT DOCUMENTS 3,269,783 A 8/1966 Kriz
3,716,833 A 2/1973 Roth
(Continued)

FOREIGN PATENT DOCUMENTS

| JP | 2007-323281 | 12/2007 |
| JP | 2011-060113 | 3/2011 |
| JP | 2016-095184 | 5/2016 |

*Primary Examiner* — Atul Trivedi
(74) *Attorney, Agent, or Firm* — Snell & Wilmer LLP (57) ABSTRACT

Methods, systems, and apparatus for a collision warning system. The collision warning system includes at least one of a navigation unit, one or more sensors or a user interface. The collision warning system includes an electronic control unit. The electronic control unit is configured to determine that the height of the vehicle or the height of the load on the vehicle is within a threshold height of the height of the object. The electronic control unit is configured to determine that the vehicle is approaching the object. The electronic control unit is configured to control an operation of the vehicle to indicate that the height of the vehicle or the height of load on the vehicle is within the threshold height when a distance between vehicle and approaching object is a first threshold distance and to avoid the approaching object when the distance is a second threshold distance.

19 Claims, 5 Drawing Sheets

(51) Int. Cl.
  *B60Q 9/00*      (2006.01)
  *B60W 50/14*     (2020.01)
  *G06F 16/9532*   (2019.01)

(56) References Cited

U.S. PATENT DOCUMENTS

| | | |
|---|---|---|
| 5,276,426 A | 1/1994 | LoBello |
| 5,389,912 A | 2/1995 | Arvin |
| 5,424,713 A | 6/1995 | Thompson et al. |
| 5,710,553 A | 1/1998 | Soares |
| 7,259,660 B2 | 8/2007 | Ewerhart et al. |
| 7,449,996 B2 | 11/2008 | Hill |
| 7,798,428 B1 | 9/2010 | Weil |
| 8,013,722 B2 | 9/2011 | Breuer et al. |
| 9,269,263 B2 | 2/2016 | Gieseke |
| 9,718,402 B2 | 8/2017 | Smyth et al. |
| 9,847,025 B2 | 12/2017 | Mohtashami |
| 2009/0121852 A1 | 5/2009 | Breuer et al. |
| 2011/0060478 A1* | 3/2011 | Nickolaou ............... G01S 17/86 701/1 |
| 2013/0093583 A1 | 4/2013 | Shapiro |
| 2013/0222592 A1* | 8/2013 | Gieseke ........... G08G 1/096708 348/148 |
| 2014/0118132 A1* | 5/2014 | Braunberger ....... B60W 30/143 340/435 |
| 2016/0371984 A1* | 12/2016 | Macfarlane .......... G05D 1/0011 |
| 2017/0069209 A1* | 3/2017 | Beaurepaire ......... G08G 1/0125 |
| 2017/0113664 A1* | 4/2017 | Nix ..................... B60T 8/17558 |
| 2018/0101177 A1* | 4/2018 | Cohen ................... H04N 7/181 |
| 2018/0201260 A1* | 7/2018 | Ichikawa ............... G01S 17/58 |
| 2019/0189006 A1* | 6/2019 | Toma ...................... G08G 1/09 |
| 2019/0243371 A1* | 8/2019 | Nister .................. G05D 1/0231 |
| 2020/0042801 A1* | 2/2020 | Auner ...................... G06T 7/73 |

* cited by examiner

VEHICLE HEIGHT DETECTION AND ENVIRONMENTAL WARNING SYSTEM

BACKGROUND

Field

This disclosure relates to detecting, warning and/or controlling an operation of the vehicle when an overhead object is in the path of a vehicle.

Description of the Related Art

The driver may encounter various overhead objects in the path of the vehicle when driving. The overhead objects may include persistent objects, such as a roadway overpass, a tunnel, a traffic sign or other overhead object that is a permanent fixture along the roadway, and/or non-persistent objects, such as tree branches, which may be removed. Some of these overhead objects, such as a tunnel, may have warning signs which may indicate a clearance height, whereas, other overhead objects, such as a tree branch, may not provide the clearance height to avoid the overhead object. A driver, however, may forget or not know the height of their vehicle, the height of a load on the vehicle and/or not see the overhead object, and thus, the driver may be unable to avoid the overhead object.

Even if the driver identifies the overhead object, the driver may not be able to avoid the overhead object, while maintaining travel in the direction of the destination. For example, if a roadway that leads to a tunnel does not have an exit or other path to avoid the tunnel between the vehicle, which has a height above the clearance height of the tunnel, and the tunnel entrance, the vehicle may have to stop before the tunnel entrance and turn around.

Additionally, various overhead objects, such as a tree branch, do not have warning signs that specify the height, and thus, a driver may have difficulty in determining whether a collision may occur.

Accordingly, there is a need for a system and a method for improving detection and warning of overhead objects.

SUMMARY

In general, one aspect of the subject matter described in this disclosure may be embodied in a collision warning system. The collision warning system includes at least one of a navigation unit, one or more sensors or a user interface. The navigation unit is configured to detect a current location of the vehicle. The one or more sensors are configured to obtain the height of the vehicle, the height of the load on the vehicle or a height of an object. The user interface is configured to obtain the height of the vehicle or the height of the load on the vehicle. The collision warning system includes an electronic control unit coupled to the at least one of the navigation unit, the one or more sensors, or the user interface. The electronic control unit is configured to determine that the height of the vehicle or the height of the load on the vehicle is within a threshold height of the height of the object. The electronic control unit is configured to determine that the vehicle is approaching the object. The electronic control unit is configured to control an operation of the vehicle to indicate that the height of the vehicle or the height of load on the vehicle is within the threshold height when a distance between vehicle and approaching object is a first threshold distance and to avoid the approaching object when the distance is a second threshold distance.

These and other embodiments may optionally include one or more of the following features. The electronic control unit may be configured to determine the distance between the vehicle and the object. The first threshold distance may be different than the second threshold distance. To control the operation of the vehicle the electronic control unit may be configured to output an audio or visual indicator to indicate that a collision with the object is imminent when the distance between the vehicle and the object is the first threshold distance and stop or slow a speed of the vehicle when the distance between the vehicle and the object is the second threshold distance. The electronic control unit may be configured to obtain, from the navigation unit, the current location of the vehicle and determine the height of the object based on the current location of the vehicle.

The collision warning system may include a communication device. The communication device may be configured to communicate with another vehicle. The electronic control unit may be coupled to the communication device and may be configured to obtain the height of the object from the other vehicle or provide the height of the object to the other vehicle.

The collision warning system may include a network access device. The network access device may be configured to communicate with an external database via a network. The electronic control unit may be coupled to the network access device and may be configured to obtain a plurality of heights of different objects within a threshold distance of the vehicle or provide the height of the object to the external database.

The one or more sensors may include a road condition sensor. The electronic control unit may use the road condition sensor to determine a height of the road obstacle or the rate of incline for the road inclination. The electronic control unit may determine that the height of the vehicle or the height of the load on the vehicle is within the threshold height based on the height of the road obstacle or the rate of incline for the road inclination.

In another aspect, the subject matter may be embodied in a system. The system includes one or more sensors positioned on the vehicle or the load of the vehicle and configured to measure or detect a height of the vehicle, a height of a load on the vehicle or a height of an object. The system includes a processor coupled to the one or more sensors. The processor is configured to determine that the height of the vehicle or the height of the load on the vehicle is greater than or equal to a threshold height. The processor is configured to determine that a distance between the vehicle and the object is decreasing. The processor is configured to determine that the object is in a path of the vehicle and control an operation of the vehicle to indicate that the height of the vehicle or the height of load on the vehicle is within the threshold height.

In another aspect, the subject matter may be embodied in a method. The method includes determining that a height of a vehicle or a height of a load on the vehicle is greater than or equal to a threshold height. The method includes determining that a distance between a vehicle and an object is decreasing. The method includes determining that the object is in a path of the vehicle. The method includes controlling an operation of the vehicle to indicate that the height of the vehicle or the height of load on the vehicle is within the threshold height when the distance is within a first threshold distance and to avoid the object when the distance is within a second threshold distance.

BRIEF DESCRIPTION OF THE DRAWINGS

Other systems, methods, features, and advantages of the present invention will be apparent to one skilled in the art

DETAILED DESCRIPTION

Disclosed herein are systems, vehicles and methods for improving obstacle overhead collision warning, detection and avoidance. Particular embodiments of the subject matter described in this disclosure may be implemented to realize one or more of the following advantages. The vehicle overhead collision detection and warning system ("collision warning system") detects the height of the vehicle along with the height of any load of the vehicle and determines whether the vehicle and/or vehicle load would collide with an overhead obstacle in the path of the vehicle. The load of the vehicle may be a trailer, cargo or other object being conveyed or transported by the vehicle. Since the collision warning system accounts for both the vehicle height and the height of any load on the vehicle ("load height"), the collision warning system will warn the driver of a collision with an overhead object by either the vehicle or the vehicle load. The collision warning system may also account for other factors, such as road obstacles and/or road inclination, which would affect the clearance height. For example, a speed bump within a tunnel or near a tunnel entrance designed to slow a vehicle, may cause the vehicle to bounce, and thus, the collision warning system may account for the increase in the overall height of the vehicle and/or vehicle load when the vehicle traverses the speed bump. This reduces the likelihood of a collision with the overhead object due to human error, e.g., a driver forgetting about the load on the vehicle and/or the driver miscalculating the vehicle height or load height.

Other benefits and advantages include the capability to control other operations of the vehicle to avoid a collision with the overhead object. The collision warning system may control other operations of the vehicle to avoid collision with the overhead object. Different operations may also be performed based on the position of the overhead object. If the overhead object occupies a single lane, the collision warning system may shift the vehicle to an adjacent lane instead of braking, for example. In another example, the collision warning system may apply the brakes to stop the vehicle from colliding with the overhead object if the overhead obstacle occupies all the lanes.

Additionally, the collision warning system may provide and/or receive updates about overhead object from a database or from other vehicles. By having real-time information, the collision warning system may more readily identify overhead objects. Moreover, the collision warning system may provide information about the overhead objects to other service providers, such as city services, so that the other service provides may clear any non-permanent/persistent obstacles, such as tree branches. This reduces non-permanent/non-persistent overhead obstacles and increases roadway safety.

Figure 1:
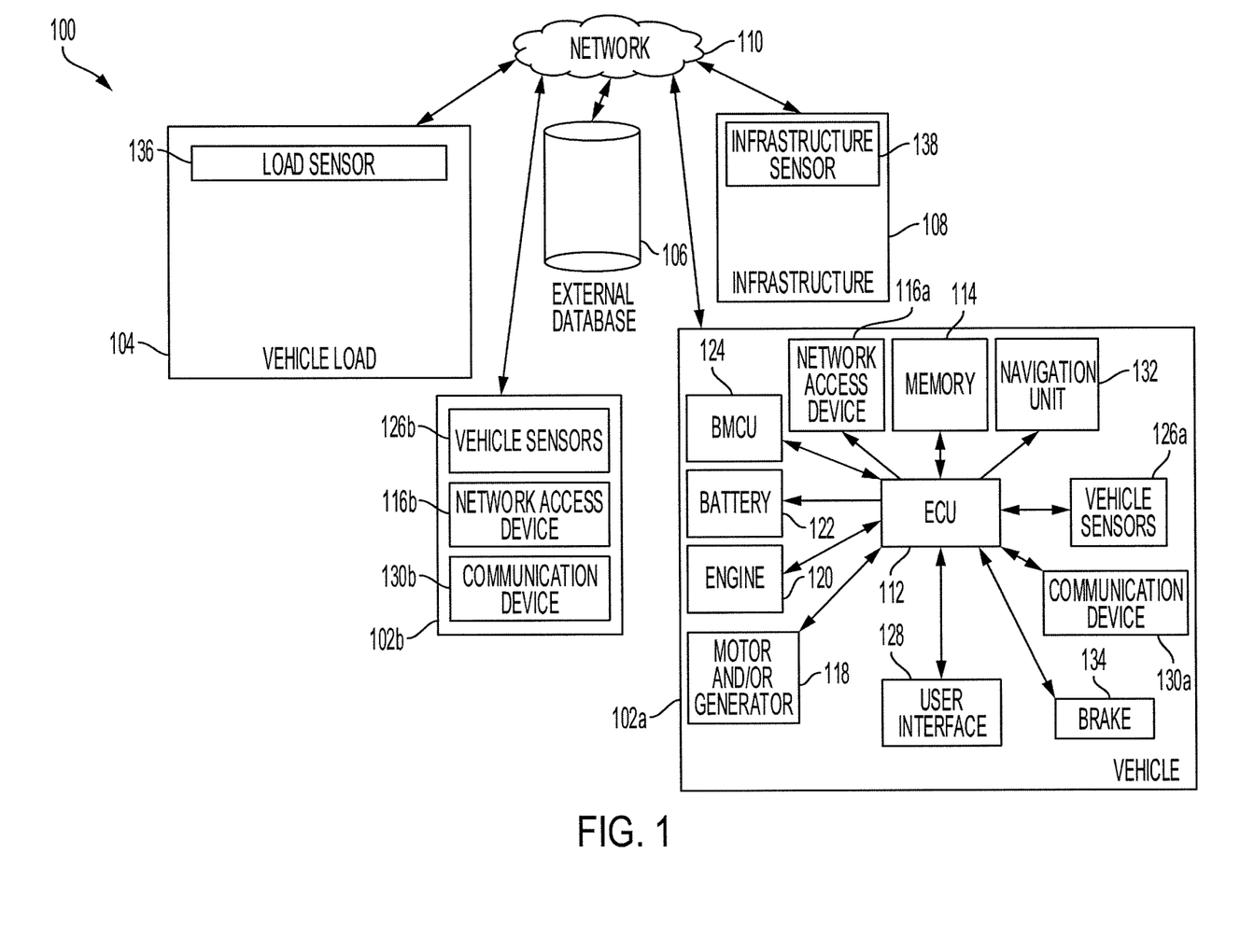
FIG. 1 is a block diagram of an example collision warning system according to an aspect of the invention.

FIG. 1 is a block diagram of a collision warning system 100. The collision warning system 100 may be retro-fitted, coupled to, include or be included within a vehicle 102a and/or a vehicle load 104. The collision warning system 100 may couple, connect to, or include one or more other entities, such as a vehicle 102b, an external database 106, and/or an infrastructure 108. In some implementations, the one or more other entities are included within the collision warning system 100 and are part of the collision warning system 100.

The collision warning system 100 may have a network 110 that links the multiple entities to obtain, provide and/or share the object height, load height and/or vehicle height information among the different entities. The network 110 may be a local area network (LAN), a wide area network (WAN), a cellular network, the Internet, or combination thereof, that connects, couples and/or otherwise communicates among the multiple entities.

The collision warning system 100 detects the height of the vehicle 102a and may provide a warning or other indicator to the driver of the vehicle 102a when the height of the vehicle 102a ("vehicle height") and/or the height of a load on the vehicle ("load height") is within a threshold height of the height of an overhead object ("object height"). When the vehicle height or the load height is within the threshold height, such as the object height, the vehicle 102a or the vehicle load 104 may collide with the overhead object. And so, the collision warning system 100 may warn the driver of the overhead object, change lanes or brake to avoid the overhead object, or perform operations to avoid or warn about the overhead object.

The collision warning system 100 may include or be retro-fitted or otherwise coupled with the vehicle 102a. A vehicle 102a-b is a conveyance capable of transporting a person, an object, or a permanently or temporarily affixed apparatus. The vehicle 102a-b may be a self-propelled wheeled conveyance, such as a car, sports utility vehicle, truck, bus, van or other motor, battery or fuel cell driven vehicle. For example, the vehicle 102a-b may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous. That is, the vehicle 102a-b may be self-maneuvering and navigate without human input. An autonomous vehicle may have and use one or more sensors and/or a navigation unit to drive autonomously.

The collision warning system 100 includes one or more processors, such as an electronic control unit (ECU) 112 and a memory 114. The collision warning system 100 may include other components, such as a navigation unit 132, one or more vehicle sensors 126a-b, a communication device 130a-b, a network access device 116a-b and/or a user interface 128. The collision warning system 100 may couple, connect to, and/or include one or more vehicle components such as the motor and/or generator 118, the engine 120, the battery 122, brake 134 and/or the battery management control unit (BMCU) 124. The one or more vehicle components may also be included within the vehicle 102b and may have similar functions and/or perform similar operations as the one or more vehicle components of the vehicle 102a, as described below.

The ECU 112 may be implemented as a single ECU or as multiple ECUs. The ECU 112 may be electrically coupled to some or all of the other components within the vehicle 102a-b, such as the motor and/or generator 118, the engine 120, the battery 122, the battery management control unit (BMCU) 124, the memory 114, the network access device 116a-b and/or one or more vehicle sensors 126. The ECU 112 may include one or more processors or controllers specifically designed for sensing, detecting, measuring and/or otherwise determining or obtaining the heights of an overhead object, the vehicle 102a and/or the vehicle load 104. The ECU 112 may determine the heights and alert the driver or control another operation of the vehicle 102a to warn the driver of the overhead object or avoid the overhead object. The ECU 112 may be coupled to a memory 114 and execute instructions that are stored on the memory 114.

The memory 114 may be coupled to the ECU 112 and store instructions that the ECU 112 executes. The memory 114 may include one or more of a Random Access Memory (RAM) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The collision warning system 100 may include a user interface 128. The collision warning system 100 may display one or more notifications on the user interface 128. The one or more notifications on the user interface 128 may notify or warn the driver of the vehicle 102a of an oncoming overhead object. The user interface 128 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 128 may receive user input that may include height information, such as the vehicle height, the object height or the load height, for example.

The collision warning system 100 may include a network access device 116a-b. The network access device 116a-b may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 116a-b may transmit data to and receive data from other entities, such as the infrastructure 108, the external database 106 and/or other vehicles 102b. For example, the vehicle 102a may communicate with the other vehicle 102b via the network access device 116a and network access device 116b, respectively, via the network 110.

The collision warning system 100 may include a communication device 130a-b. The communication device 130a-b may include vehicle-to-infrastructure (V2I) communication that communicates with a device connected to a roadway or traffic infrastructure (hereinafter, "infrastructure") 108. The communication device 130a-b may include vehicle-to-vehicle (V2V) communication that communicates with another vehicle 102b that is in proximity to the vehicle 102a. The communication device 130a-b communicates V2I and/or V2V to obtain the height of overhead objects within proximity to the vehicle 102a in real-time, for example. In some implementations, the communication device 130a-b may communicate with any other object or device (V2X) to obtain the height of the overhead objects.

The collision warning system 100 may include navigation unit 132 and/or one or more vehicle sensors 126. The navigation unit 132 may be integral to the vehicle 102a or a separate unit coupled to the vehicle 102a, such as a personal device with navigation capabilities. When the navigation unit 132 is separate from the vehicle 102a, the navigation unit 132 may communicate with the vehicle 102a via the network access device 116a. In some implementations, the vehicle 102a may include a Global Positioning System (GPS) unit (not shown) for detecting location data and date/time information instead of the navigation unit 132. In that regard, the ECU 112 may perform the functions of the navigation unit 132 based on data received from the GPS unit. At least one of the navigation unit 132 or the ECU 112 may predict or propose a route set that includes a starting location and a destination location. The navigation unit 132 or the ECU 112 may perform navigation functions. Navigation functions may include, for example, route and route set prediction, providing navigation instructions, and receiving user input such as verification of predicted routes and route sets or destinations.

The navigation unit 132 may provide and obtain navigational map information based on the detected location data, which may include a current location, a starting location, a destination location and/or a route between the starting location or current location and the destination location of the vehicle 102a and may include a memory (not shown) for storing route data. The navigation unit 132 may receive data from other sensors capable of detecting data corresponding to location information. For example, the other sensors may include a gyroscope or an accelerometer.

The navigation unit 132 may provide or obtain navigational map information. The navigational map information may include roadway information. The roadway information may indicate one or more locations of overhead infrastructure objects, such as a tunnel, power lines, overpass or other overhead obstruction, along with the relative height of the corresponding overhead object from the surface of the roadway, i.e., the object height. The roadway information may indicate one or more locations of surface road features, such as speed bumps and/or road inclines, which may affect the relative height between the surface of the roadway and an overhead object along with the height of the surface road feature, i.e., road feature height. The navigational map information may include other overhead object information, such as reported tree branches that are overhanging a roadway, and the corresponding height.

The one or more vehicle sensors 126 may include one or more height sensors and/or one or more weight sensors. The one or more height sensors may measure, detect or otherwise determine the vehicle height and/or the load height. The one or more height sensors may be positioned on the top of the vehicle 102a and measure the distance from the top of the vehicle 102 to the surface of the roadway that the vehicle 102a is traversing, for example. In another example, the one or more height sensors may measure or determine the height of a load that is connected to the vehicle 102a. The one or more weight sensors may measure, obtain or otherwise determine that there is a load on the vehicle 102a. For example, the one or more weight sensors may measure the weight of an object attached or on the vehicle 102a and determine that there is a load when the weight is greater than or equal to a threshold weight.

The one or more vehicle sensors 126 may include a road condition sensor that may detect the road inclination or road obstacle. The road condition sensor may measure the height of the road obstacle and/or the rate of incline of the road inclination.

The various sensors, such as the one or more vehicle sensors 126*a-b*, the load sensor 136 and/or the infrastructure sensors 138 may use various technologies, such as infrared, radar, LIDAR, millimeter wave, or a camera to capture data to determine to heights of the overhead object, road object, vehicle and/or vehicle load, or to determine distances between objects. In some implementations, the various sensors communicate with one another to exchange the height or distance information.

The collision warning system 100 may couple, connect to, and/or include one or more vehicle components. The one or more vehicle components may include a motor and/or generator 118. The motor and/or generator 118 may convert electrical energy into mechanical power, such as torque, and may convert mechanical power into electrical energy. The motor and/or generator 118 may be coupled to the battery 122. The motor and/or generator 118 may convert the energy from the battery 122 into mechanical power, and may provide energy back to the battery 122, for example, via regenerative braking. In some implementations, the vehicle 102*a-b* may include one or more additional power generation devices such as the engine 120 or a fuel cell stack (not shown). The engine 120 combusts fuel to provide power instead of and/or in addition to the power supplied by the motor and/or generator 118.

The battery 122 may be coupled to the motor and/or generator 118 and may provide electrical energy to and receive electrical energy from the motor and/or generator 118. The battery 122 may include one or more rechargeable batteries.

The BMCU 124 may be coupled to the battery 122 and may control and manage the charging and discharging of the battery 122. The BMCU 124, for example, may measure, using battery sensors, parameters used to determine the state of charge (SOC) of the battery 122. The BMCU 124 may control the battery 122 to maintain a reserve power explicitly for providing a sudden burst of electrical energy to be converted into power for the transmission to drive or move the multiple wheels of the vehicle 102*a-b*.

The one or more vehicle components may include the brake 134. The brake 134 may be depressed to reduce or slow the speed of the vehicle 102*a*. The brake 134 may be used to stop the vehicle 102*a* to avoid colliding with an overhead object, for example.

The collision warning system 100 may include or be coupled to the vehicle load 104. The vehicle load 104 may be a trailer, a container, a flat bed, a tow winch or other load or accessory connected or on the vehicle 102*a*. The vehicle 102*a* may use a vehicle sensor to determine the load height and/or may communicate with the vehicle load 104, such as a device on the vehicle load, to obtain the load height. The vehicle load 104 may include a load sensor 136. The load sensor 136 may measure, obtain or otherwise detect the height of the load relative to the surface of the roadway that the vehicle 102*a* is traversing. The load sensor 136 may provide the height to vehicle 102*a* to determine the overall height of the vehicle 102*a*.

The collision warning system 100 may include or be coupled to the external database 106. A database is any collection of pieces of information that is organized for search and retrieval, such as by a computer, and the database may be organized in tables, schemas, queries, reports, or any other data structures. A database may use any number of database management systems. The external database 106 may include a third-party server or website that stores or provides information. The information may include real-time information, periodically updated information, or user-inputted information. A server may be a computer in a network that is used to provide services, such as accessing files or sharing peripherals, to other computers in the network.

The external database 106 may be a transportation database that tracks overhead objects including persistent and non-persistent overhead objects. The external database 106 may be updated and/or provide updates in real-time. The external database 106 may store and/or provide overhead object information, such as the locations of one or more tree branches or other non-persistent overhead objects and/or the locations of the non-persistent overhead objects. The external database 106 store and/or provide weather information including the temperature, weather, road conditions, amount of precipitation and/or other weather factors that may affect the relative height between the surface of a roadway and the object height. For example, when the weather is cold and there is precipitation, the collision warning system 100 may extrapolate that there are icicles at the location of a tree branch that is overhanging a roadway and factor the weather information into the analysis of the object height.

The collision warning system 100 may include or be coupled to the infrastructure 108. The infrastructure 108 may be a roadway infrastructure or other persistent overhead object that presents a potential collision hazard to an oncoming vehicle 102*a* with or without a vehicle load 104. The infrastructure 108 may have one or more infrastructure sensors 138 positioned on the infrastructure 108. The one or more infrastructure sensors 138 may detect, measure or otherwise determine the height of the object and/or a distance between the object and an approaching vehicle 102*a*. The one or more infrastructure sensors 138 may communicate the object height and/or distance to the vehicle 102*a* so that the collision warning system 100 may determine whether the infrastructure 108 presents a collision hazard to the vehicle 102*a*.

Figure 2:
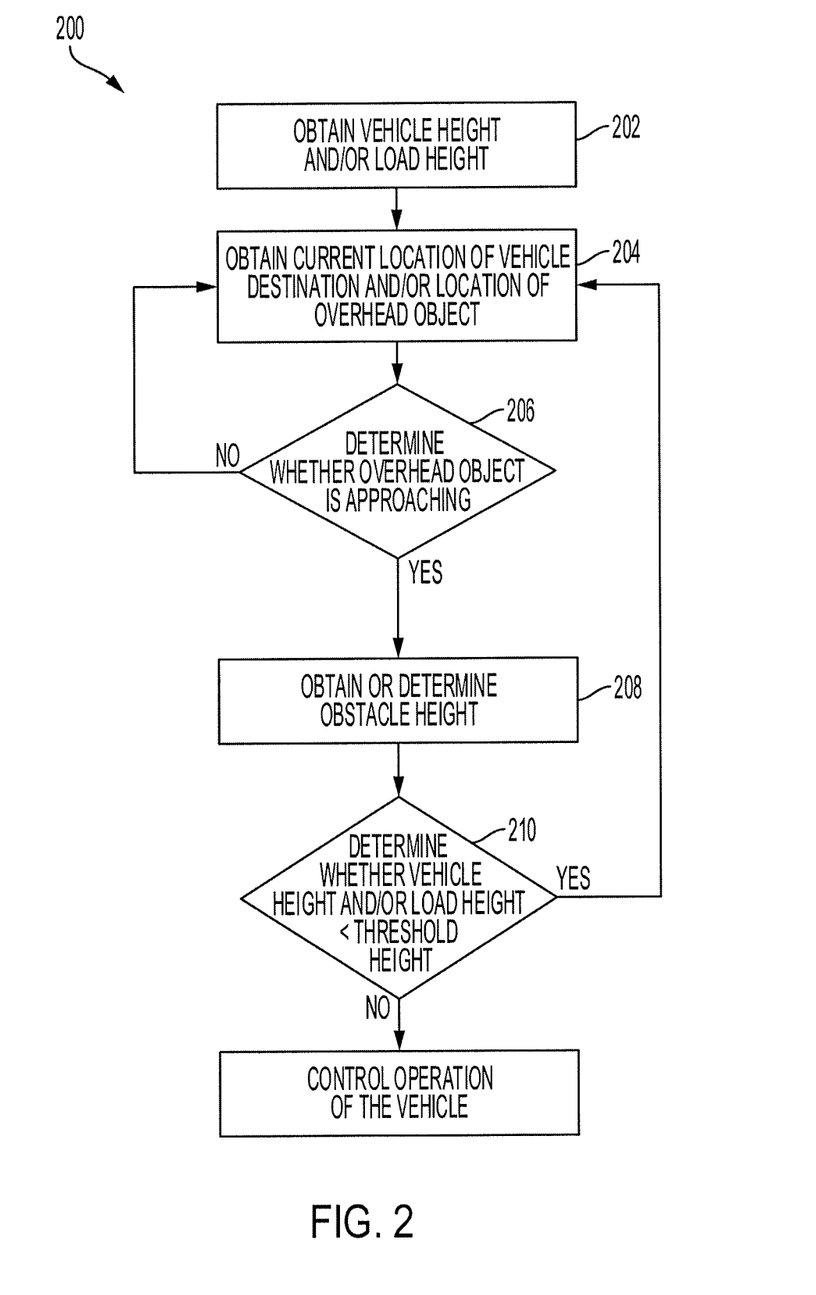
FIG. 2 is a flow diagram of an example process for detecting and warning a driver of an overhead obstacle using the collision warning system of FIG. 1 according to an aspect of the invention.

FIG. 2 describes the process 200 for detecting and warning a driver of an overhead object. One or more computers or one or more data processing apparatuses, for example, the ECU 112 of the collision warning system 100 of FIG. 1, appropriately programmed, may implement the process 200.

Figure 3:
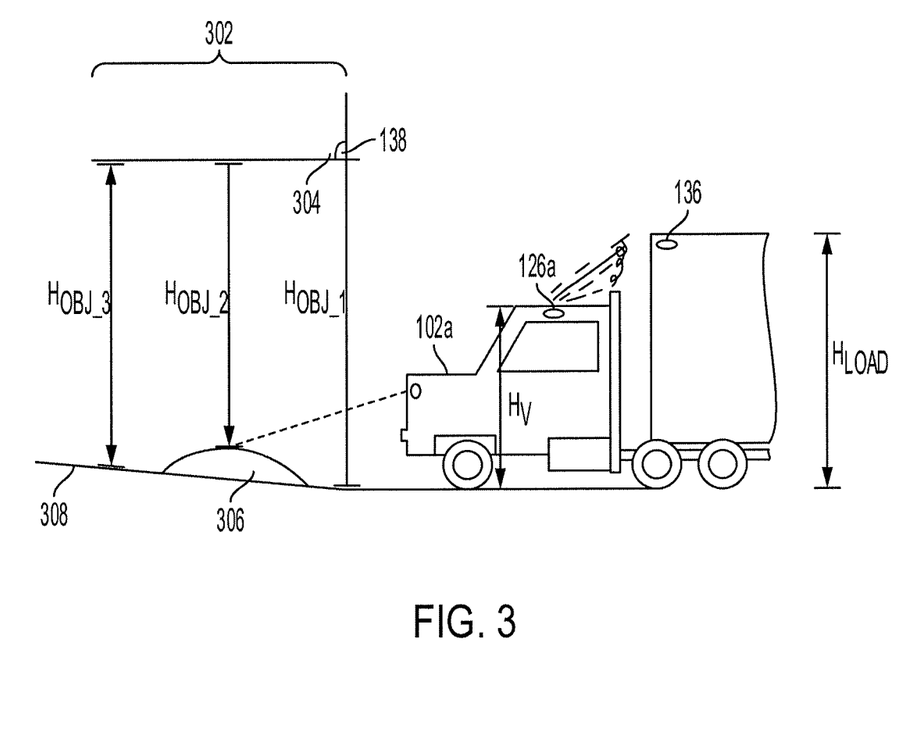
FIG. 3 shows the various heights of the vehicle, load and/or obstacle as the vehicle approaches an overhead obstacle according to an aspect of the invention.
Figure 4:
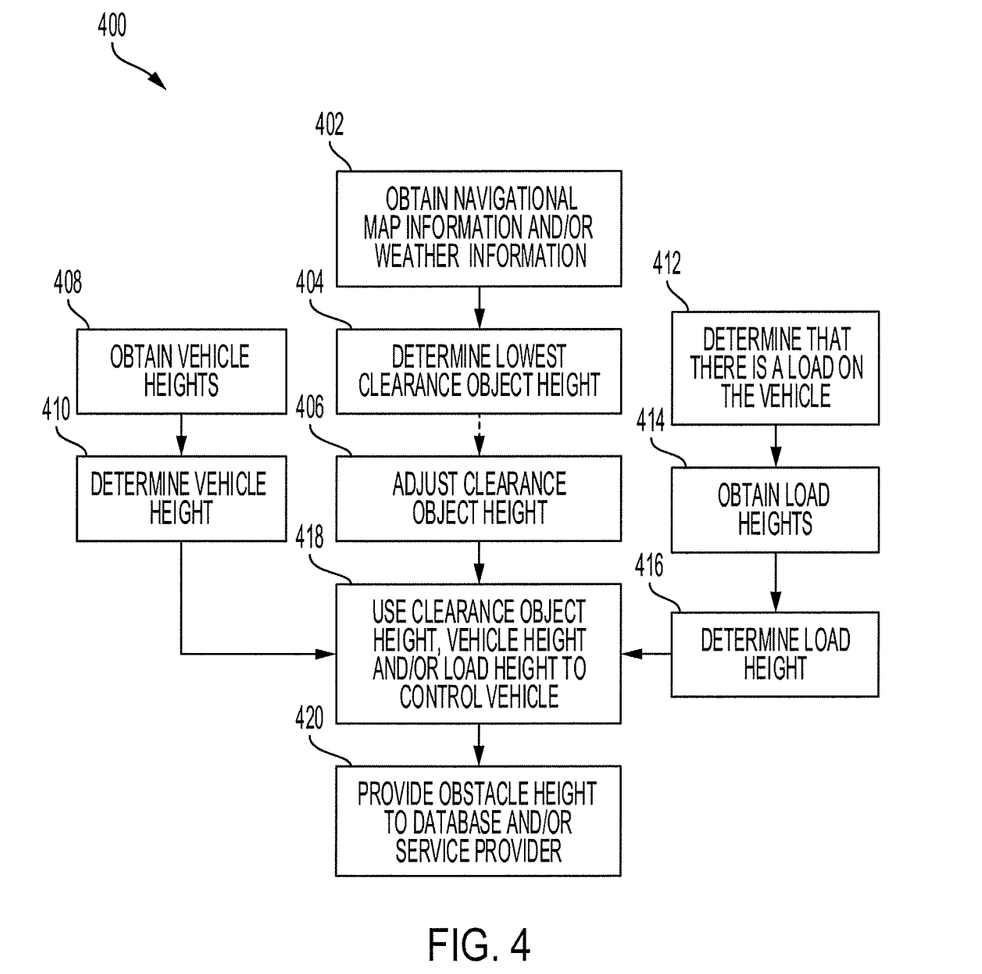
FIG. 4 is a flow diagram of an example process for obtaining and determining the object height, the load height and/or the obstacle height using the collision warning system of FIG. 1 according to an aspect of the invention.

The collision warning system 100 obtains a height of the vehicle 102*a* and/or a height of the load on the vehicle 102*a* (202). The collision warning system 100 may obtain the vehicle height, $H_{Vehicle}$, and/or the load height, $H_{Load}$, using the one or more vehicle sensors 126*a* and/or load sensors 136, respectively, and as shown in FIG. 3 for example. For example, a front camera may measure a height of the vehicle 102*a* and/or a height of an overhead object, and a rearward facing camera may measure a height of the load on the vehicle 102*a*. In some implementations, the collision warning system 100 may obtain the height from user input via the user interface 128. FIG. 4 further describes the process 400 of obtaining the vehicle height, the load height and/or the object height.

The collision warning system 100 obtains a current location of the vehicle, a destination location, and/or one or more locations of overhead objects (204). The collision warning system 100 may use the navigation unit 132 to obtain navigational map information, which includes the locations of the one or more overhead objects, the current location, the destination location and/or the route of the vehicle 102*a*. The one or more overhead objects may be either persistent or non-persistent objects. The collision warning system 100 may receive user input that indicates a destination location, and subsequently, create a route or path between the current location and the destination.

In some implementations, the collision warning system 100 provides the current location of the vehicle 102 and/or route to an external database 106, and in response, receives the one or more locations of overhead objects in proximity to the current location of the vehicle 102, such as within a 2 mile radius, and/or along the route between the current location and the destination.

The collision warning system 100 determines whether an overhead object is approaching (206). The collision warning system 100 may determine that the overhead object is approaching when the location of the overhead object is within the route of the vehicle 102a and when a relative distance between the overhead object and the vehicle 102a is decreasing.

The collision warning system 100 may determine a route based on the current location of the vehicle and the destination location, which may have been obtained via user input and/or the navigational map information. In some implementations, the collision warning system 100 determines the route based on the current location of the vehicle 102a and a direction of travel. For example, the collision warning system 100 may obtain the current location of the vehicle 102a over an elapsed time period and determine the direction of travel from the change in the current location of the vehicle 102a during the elapsed time period.

Once the collision warning system 100 determines the route and obtains the current location, if the location of the overhead object is within the path of the route, the collision warning system 100 may measure the relative distance between the overhead object and vehicle using one or more vehicle sensors 126a or based on the change in distance between the current location of the vehicle 102a and the location of the overhead object. If the relative distance is decreasing, the collision warning system 100 may determine that the overhead object is approaching. If the collision warning system 100 determines that the overhead object is not approaching, the collision warning system 100 continues to monitor the current location of the vehicle 102a and the locations of the one or more overhead objects (204).

If the collision warning system 100 determines that the overhead object is approaching, the collision warning system 100 obtains or otherwise determines the height of the approaching object (208). The collision warning system 100 may obtain the object height of the overhead object, $H_{obj\_1}$, using one or more vehicle sensors 126a-b or obtained from the navigational map information, as shown in FIG. 3 for example. The overhead object may have various object heights, $H_{obj\_1, obj\_2, obj\_3}$, at different points or locations along the longitudinal length of the overhead object. The object height and/or various object heights are measurements of the relative height of the overhead object from the surface of the roadway at the entrance or an initial point and/or along various points along the length of the overhead object, respectively. FIG. 4 further describes the process 400 of obtaining the vehicle height, the load height and/or the object height. In some implementations, the collision warning system 100 communicates with an infrastructure sensor 138 or other vehicle 102b to obtain the object height of an approaching object.

The collision warning system 100 determines whether the vehicle height and/or load height is less than a threshold height (210). The threshold height may be the object height or the lowest clearance height of the various object heights, i.e., the lowest clearance height is the lowest height along the length of the entire overhead object. In some implementations, the threshold height may include a safety margin, such that there is a minimum clearance between the vehicle height and/or the load height with the lowest clearance height. The safety margin may be approximately between 1 to 2 feet, which allows other objects, such as a light, to be installed underneath the overhead object.

Figure 5:
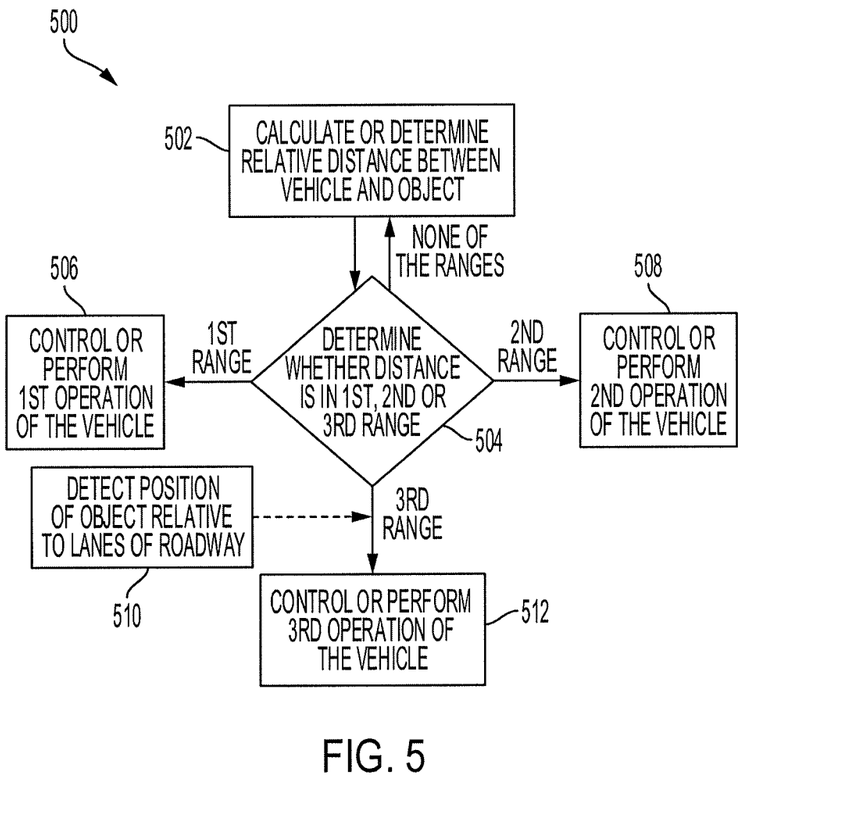
FIG. 5 is a flow diagram of an example process for controlling different operations of the vehicle to alert the driver and/or avoid an oncoming or approaching overhead obstacle using the collision warning system of FIG. 1 according to an aspect of the invention.

The collision warning system 100 may compare the vehicle height and/or load height with the threshold height. If the vehicle height and/or the load height is less than the threshold height, the collision warning system 100 allows the vehicle 102a to proceed along the path pass the overhead object and continues to periodically or continuously monitor the current location of the vehicle 102a and the locations of the one or more overhead objects (204). If the vehicle height and/or the load height is greater than or equal to the threshold height, the collision warning system 100 may control an operation of the vehicle 102 to alert the driver or avoid the overhead object (212). FIG. 5 further describes the process 500 of controlling an operation of the vehicle 102a in response to determining that the vehicle height and/or the load height is greater than or equal to the threshold height.

FIG. 4 describes the process 400 for the process 400 of obtaining the vehicle height, the load height and/or the object height. One or more computers or one or more data processing apparatuses, for example, the ECU 112 of the collision warning system 100 of FIG. 1, appropriately programmed, may implement the process 400.

The collision warning system 100 may obtain navigational map information and/or weather information (402). The navigational map information may include a current location of the vehicle 102a, a destination location of the vehicle 102a and/or one or more locations of overhead objects and/or the corresponding heights of the overhead objects. The weather information may include weather, such as precipitation and temperature, at or near the current location of the vehicle 102a.

When the vehicle 102a is approaching one or more locations of the overhead object, as described above, the collision warning system 100 may obtain and determine the object height (404). The collision warning system 100 may obtain and/or determine the object height based on different modes to obtain and/or determine the object height from different sources. In one mode, the collision warning system 100 may send the current location of the vehicle 102a and/or the location of the overhead object to the external database, and in response, obtain a corresponding height of the overhead object. In another mode, the collision warning system 100 extracts the corresponding object height from the navigational map information that was obtained using the navigation unit 132. In other modes, the collision warning system 100 obtains the corresponding object height from another vehicle 102b, such as by using V2V communication, obtains the corresponding height from an infrastructure sensor 138, such as by using V2I communication, or uses the one or more vehicle sensors 126a to detect or measure the object height. For example, the collision warning system 100 may measure or detect an initial object height, $H_{obj\_1}$, at an entrance 304 of a tunnel or overpass 302, using the one or more vehicle sensors 126a or the load sensor 136, as shown in FIG. 3. In another example, the vehicle 102a may use the communication device 130a to communicate with the vehicle 102b and obtain the object height. The vehicle 102b may be traveling in front of the vehicle 102a and provide the object height and location of the object to the vehicle 102a using V2V communication, for example.

The collision warning system 100 may obtain the object height from multiple sources, such as from a combination of the navigational map information, from another vehicle 102b, from the vehicle sensors 126a and/or infrastructure sensor 138. In some implementations, the collision warning system 100 obtains multiple and/or various object heights, such as the object height within the tunnel or overpass 302, $H_{obj\_3}$, for a single overhead object. The various object heights may represent different heights along a longitudinal length of the overhead object and may be different than the initial object height at the entrance. For example, the object height, $H_{obj\_3}$, is different than the object height, $H_{obj\_1}$, because of the road incline 308, and thus, the collision warning system 100 accounts for the road incline 308.

The collision warning system 100 may compare the multiple object heights and use the object height that is most frequently obtained from the different sources and/or average the multiple object heights. The collision warning system 100 may determine a lowest clearance height by using the object height that is the least or lowest, which may represent the lowest clearance height between the surface of the roadway and the overhead object at any point.

The collision warning system 100 may adjust the object height based on a height of a surface object 306 and/or weather information (406). The collision warning system 100 may detect or determine that there is a surface object 306 within the path of the vehicle 102a when the vehicle 102a traverses through the overhead object and further base the object height on the height of the surface object 306 The collision warning system 100 may determine the location of the surface object 306 from the navigational map information and/or use the vehicle sensors 126a to detect the surface object 306. The collision warning system 100 determines the relative object height, $H_{obj\_2}$, based on the surface object height and the relative height between the overhead object and surface of the roadway and may provide for an additional safety margin to accommodate an unexpected vehicle reaction, such as a vehicle 102a slightly jumping up from the road surface.

In some implementations, the collision warning system 100 may adjust the object height based on weather information. For example, the collision warning system 100 may anticipate that icicles may form on an overhead object, such as a tree branch, and provide for a safety margin, e.g., a lower clearance height, when determining the object height.

The collision warning system 100 obtains one or more heights of the vehicle 102a (408). The collision warning system 100 may obtain the heights of the vehicle 102a using one or more vehicle sensors 126a. The one or more vehicle sensors 126a may be a height sensor positioned at the top of the vehicle 102a and measures the distance or height from the top of the vehicle 102a to the surface of the roadway. The height sensor may use radar, LIDAR and/or a camera to detect and/or measure the vehicle height. Also, the collision warning system 100 may receive user input that indicates the vehicle height.

The collision warning system 100 may use the user input of the vehicle height, the measured and/or detected vehicle height and/or a combination of both to determine the vehicle height (410). The collision warning system 100 may compare the user input of the vehicle height with the measured and/or detected vehicle height, and if the user-inputted vehicle height and the measured and/or detected vehicle are within a threshold deviation, such as a deviation less than 5%, the collision warning system 100 may use the greater of or an average of the user-inputted vehicle height and the measured and/or detected vehicle height as the vehicle height.

The collision warning system 100 may detect that there is a load on the vehicle 102a (412). One or more of the vehicle sensors 126a may be a load detection sensor. The load detection sensor may measure a weight or load on the vehicle 102a that is greater than or equal to a threshold weight, such as a default weight, and/or detect that there is a load on the vehicle 102a using radar.

When there is a load on the vehicle 102a, the collision warning system 100 may obtain the one or more heights of the load (414). The collision warning system 100 may receive user input, one or more of the vehicle sensors 126a, one or more load sensors 136 and/or communicate with an infrastructure sensor 138 to determine the load height. For example, the one or more load sensors 136 may be positioned at the top of the load and measure the height to the surface of the roadway. In another example, the one or more vehicle sensors 126 may capture an image or use radar to determine the load height. In another example, the collision warning system 100 may receive user input of the load height.

In some implementations, the load height and vehicle height may be stored within a profile and/or user configuration within the memory 114. The profile and/or user configuration may be loaded from the memory 114 by the driver via user input upon initialization of the vehicle 102a, for example.

The collision warning system 100 may, similarly, use the user input of the load height, the measured and/or detected load height, the communicated load height and/or a combination of the various load heights to determine the load height (416). The collision warning system 100 may compare the various obtained load heights and determine if they various obtained load heights are within a threshold deviation, such as a deviation less than 5%. If the various obtained load heights are within the threshold deviation, the collision warning system 100 may use the greater or an average of the obtained various load heights. By comparing multiple sources and/or multiple values of the object height, the vehicle height and/or the load height, the collision warning system 100 more accurately calculates the clearance between the vehicle and/or load height and the object height. Moreover, the collision warning system 100 to use real-time up-to-date information in the height calculations to correct or adjust for any anomalies or changes in status of the heights.

The collision warning system 100 uses the vehicle height, load height and object height to warn the driver or otherwise control the vehicle 102a, as described in FIG. 5 (418). The collision warning system 100 may provide the object height and corresponding location to another vehicle 102b, to the external database 106 and/or to a service provider, such as city services (420). By providing the object height to other vehicles and/or to the external database 106, other vehicles 102b may obtain and use the object height in alerting a driver or controlling an operation of the vehicle 102b. This provides for the real-time access of the updated object height and allows for the external database or service provider to map locations of overhead objects. By providing the object height and the corresponding location, a service provider, such as city services, may address or otherwise act to remove the overhead object, such as by cutting down the tree branch, as soon as possible.

FIG. 5 describes the process 500 for controlling different operations of the vehicle 102a to alert the driver and/or avoid an oncoming or approaching overhead object. One or more computers or one or more data processing apparatuses, for example, the ECU 112 of the collision warning system 100 of FIG. 1, appropriately programmed, may implement the process 500.

When the collision warning system 100 determines that the vehicle height and/or the load height is greater than or equal to the threshold height, such as the object height or an object height with a safety margin of an approaching object, the collision warning system 100 may control the operation of the vehicle 102a based on relative distance between the current location of the vehicle 102a and the location of the approaching object. The collision warning system 100 may calculate or determine the relative distance between the current location of the vehicle 102a and/or the location of the approaching object (502). The collision warning system 100 obtains the current location and/or the location of the approaching object, as described above, and may calculate the difference in distance between the current location and the location of the approaching object.

The distance between the overhead object and the vehicle 102a may refer to the distance between the overhead object and the front-most portion of the vehicle 102a when the vehicle is driving forward or the back-most portion of the vehicle 102 when the vehicle is driving in reverse. In some implementations, the distance is calculated from the highest or tallest point of the vehicle 102a and/or the vehicle load 104.

The collision warning system 100 may determine whether the distance between the current location and the location of the approaching object is within a first range, such as between a first threshold distance and a second threshold distance, within a second range, such as between the second threshold distance and a third threshold distance, or within a third range, such as less than the third threshold distance (504). The different thresholds may be affected by weather, and so, the collision warning system 100 may be based upon road conditions and/or weather conditions. In some implementations, the thresholds are pre-configured and/or user-inputted.

The first threshold distance may be greater than the second threshold distance and the second threshold distance may greater than the third threshold distance. For example, the first threshold distance may be approximately more than 1.5 miles away from the approaching object, the second threshold distance may be approximately ½ mile from the approaching object, and the third threshold distance may be approximately a few hundred feet away from the approaching object. If the distance between the current location and the location of the approaching object is not less than the first threshold distance, the collision warning system 100 may continue to monitor the difference in distance between the current location and the location of the approaching object (502).

If the collision warning system 100 determines that the distance between the current location and the location of the approaching object is less than the first threshold distance but greater than the second and third threshold distance, the collision warning system 100 may control a first operation of the vehicle 102a (506). The collision warning system 100 may reroute the planned route to provide navigation instructions that avoid traversing the roadway with the approaching object. The collision warning system 100 may reroute the navigation instructions, such as suggesting a different exit from a highway or taking an entirely different route. The rerouted navigation instructions may instruct the driver or suggest to the driver an alternative route that circumvents the approaching object and any other overhead objects with object heights that are less than or equal to the vehicle height and/or load height. Since the vehicle 102a is still far away from the location of the approaching object, the vehicle 102a may suggest routes to avoid the approaching object.

If the collision warning system 100 determines that the distance between the current location and the location of the approaching object is less than the first threshold distance and less than the second threshold distance but greater than the third threshold distance, the collision warning system 100 may disable the first operation of the vehicle 102a and may control a second operation of the vehicle 102a (508). The collision warning system 100 may send, provide, notify or otherwise alert or warn the driver of the approaching object. The collision warning system 100 may use an audio and/or visual indicator to alert the driver of the approaching object and/or may display a notification or alert on the user interface 128 to warn the driver of the approaching object. In some implementations, the collision warning system 100 does not disable the first operation, while the collision warning system 100 controls the second operation, and so, the collision warning system 100 may continue to provide alternative routes, while alerting the driver via the audio and/or visual indicator, for example.

The collision warning system 100 may obtain or determine a position of the overhead object (510). The collision warning system 100 may use one or more sensors, such as the vehicle sensors 126a, to determine the relative position of the overhead object in relation to the one or more lanes on the roadway. For example, the collision warning system 100 detect that a tree branch blocks the right most lane but not the center lane.

If the collision warning system 100 determines that the distance between the current location and the location of the approaching object is less than the third threshold distance, the collision warning system 100 may disable the first and second operation of the vehicle 102a and may control a third operation of the vehicle 102a (512). For example, the collision warning system 100 may initiate the brakes 134 to stop or reduce the speed of the vehicle 102a to prevent a collision with the overhead object or provide more time for the driver to avoid the overhead object. In another example, the collision warning system 100 may change lanes if the overhead object is only an object within the current lane. In another example, the collision warning system 100 may actuate the steering or other functionality to avoid a collision with the object when the vehicle is within the third threshold distance, e.g., imminently close, near or within a threshold distance of the overhead object. When the collision warning system 100 performs the third operation, such as actuating the brakes 134 or changing lanes, because the vehicle 102a is within the third threshold distance, the collision warning system 100 may additionally provide information to another vehicle 102b within proximity of the vehicle 102 that indicates to the other vehicle 102b of the action taken. For example, if the collision warning system 100 actuates the brakes, the collision warning system 100 may notify the vehicle 102b behind the vehicle 102 that the vehicle 102a is initiating a stop. This allows other vehicles 102b to anticipate or react to the third operation. In some implementations, the collision warning system 100 does not disable the first operation and/or second operation, while the collision warning system 100 controls the third operation, and so, the collision warning system 100 may continue to provide alternative routes continue to alert the driver, while slowing the vehicle 102a, for example.

In some implementations, the collision warning system 100 performs the third operation based on the position of the object. For example, if the object only blocks the right most lane but not the center lane, the collision warning system 100 may change lanes to the center lane to avoid the object instead of causing the vehicle 102a to brake.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A collision warning system for a vehicle, comprising:
   a navigation unit configured to detect a current location of the vehicle;
   a sensor configured to measure or detect a height of the vehicle or a height of a load on the vehicle; and
   an electronic control unit coupled to the navigation unit and the sensor, and being configured to:
      determine that an overhead object is approaching based on the current location of the vehicle,
      determine that the height of the vehicle or the height of the load on the vehicle is greater than or equal to a threshold height based on a height of the overhead object,
      provide an alert when a distance between the vehicle and the overhead object is a first threshold distance, and
      avoid the overhead object or stop the vehicle when the distance is a second threshold distance that is different from the first threshold distance.

2. The collision warning system of claim 1, wherein the electronic control unit is configured to:
   determine the distance between the vehicle and the overhead object.

3. The collision warning system of claim 1, wherein to provide the alert when the distance between the vehicle and the overhead object is the first threshold distance the electronic control unit is configured to:
   output an audio or visual indicator to indicate that a collision with the overhead object is imminent when the distance between the vehicle and the overhead object is the first threshold distance.

4. The collision warning system of claim 1, wherein the electronic control unit is configured to:
   obtain, from the navigation unit, the current location of the vehicle; and
   determine the height of the overhead object based on the current location of the vehicle.

5. The collision warning system of claim 1, further comprising:
   a communication device configured to communicate with another vehicle;
   wherein the electronic control unit is coupled to the communication device and configured to:
      obtain the height of the overhead object from the other vehicle, or
      provide the height of the overhead object to the other vehicle.

6. The collision warning system of claim 1, further comprising:
   a network access device configured to communicate with an external database via a network;
   wherein the electronic control unit is coupled to the network access device and configured to:
      obtain a plurality of heights of different overhead objects within a threshold distance of the vehicle, and
      provide the height of the overhead object to the external database.

7. The collision warning system of claim 1, further comprising:
   a second sensor configured to detect a road inclination or a road obstacle, wherein the electronic control unit is configured to:
   determine a height of the road obstacle or a rate of incline for the road inclination; and
   determine that the height of the vehicle or the height of the load on the vehicle is greater than or equal to the threshold height further based on the height of the road obstacle or the rate of incline of the road inclination.

8. A system, comprising:
   a sensor positioned on a vehicle or a load of the vehicle and configured to measure or detect a height of the vehicle or a height of the load on the vehicle; and
   a processor coupled to the sensor and being configured to:
      determine that the height of the vehicle or the height of the load on the vehicle is greater than or equal to a threshold height based on a height of an overhead object,
      determine that a distance between the vehicle and the overhead object is decreasing,
      determine that the overhead object is in a path of the vehicle,
      alert a driver of the vehicle when a distance between the vehicle and the overhead object is a first threshold distance, and
      avoid the overhead object or stop the vehicle when the distance is a second threshold distance that is different form the first threshold distance.

9. The system of claim 8, wherein to alert the driver of the vehicle when the distance between the vehicle and the overhead object is the first threshold distance the processor is configured to:
   output an audio or visual indicator to indicate that a collision with the overhead object is imminent when the distance between the vehicle and the overhead object is less than the first threshold distance and greater than or equal to the second threshold distance.

10. The system of claim 8, further comprising:
    a navigation unit configured to obtain a current location of the vehicle,
    wherein the processor is configured to:
       obtain, from the navigation unit, the current location of the vehicle, and
       determine a plurality of heights of different overhead objects within a proximity of the current location of the vehicle including the height of the overhead object.

11. The system of claim 8, further comprising:
    a communication device configured to communicate with another vehicle;
    wherein the processor is coupled to the communication device and configured to:
       obtain the height of the overhead object from the other vehicle, or provide the height of the overhead object to the other vehicle.

12. The system of claim 8, further comprising:
a network access device configured to communicate with an external database via a network;
wherein the processor is coupled to the network access device and configured to:
obtain a plurality of heights of different overhead objects within a threshold distance of the vehicle including the height of the overhead object, or
provide the height of the overhead object to the external database.

13. The system of claim 8, further comprising:
a second sensor configured to detect a road inclination or a road obstacle, wherein the processor is configured to:
determine a height of the road obstacle or a rate of incline of the road inclination; and
determine that the height of the vehicle or the height of the load on the vehicle is greater than or equal to the threshold height further based on the height of the road obstacle or the rate of incline of the road inclination.

14. The system of claim 8 wherein the threshold height is the height of the overhead object.

15. A method, comprising:
determining that a height of a vehicle or a height of a load on the vehicle is greater than or equal to a threshold height based on a height of an overhead object;
determining that a distance between the vehicle and the overhead object is decreasing;
determining that the overhead object is in a path of the vehicle;
providing an alert when a distance between the vehicle and the overhead object is a first threshold distance; and
avoiding the overhead object or stopping the vehicle when the distance is a second threshold distance that is different from the first threshold distance.

16. The method of claim 15, wherein the threshold height is the height of the overhead object from a ground or a roadway.

17. The method of claim 15, wherein providing the alert includes outputting an audio or visual indicator to indicate that a collision with the overhead object is imminent when the distance between the vehicle and the overhead object is less than the first threshold distance and greater than or equal to the second threshold distance.

18. The method of claim 15, further comprising:
determining a rate of road inclination or a height of a road obstacle; and
determining that the height of the vehicle or the height of the load on the vehicle is greater than or equal to the threshold height further based on the rate of road inclination or the height of the road obstacle.

19. The method of claim 15, further comprising:
obtaining a current location of the vehicle and a location of the overhead object; and
obtaining a direction of travel of the vehicle;
wherein determining that the distance between the vehicle and the overhead object is decreasing is based on the current location of the vehicle and the location of the overhead object and determining that the overhead object is in the path of the vehicle is based on the direction of travel of the vehicle, the current location of the vehicle and the location of the overhead object.

* * * * *